Nov. 27, 1928.

W. J. SLAVIN 1,693,353

DRAG SCRAPER

Filed Feb. 23, 1926    2 Sheets—Sheet 1

Inventor
William J. Slavin,
By
Attorneys

Nov. 27, 1928.         W. J. SLAVIN         1,693,353
DRAG SCRAPER
Filed Feb. 23, 1926         2 Sheets-Sheet 2

Inventor
William J. Slavin,
By
Attorneys

Patented Nov. 27, 1928.

1,693,353

UNITED STATES PATENT OFFICE.

WILLIAM J. SLAVIN, OF HOWELL, MICHIGAN.

DRAG SCRAPER.

Application filed February 23, 1926. Serial No. 89,960.

This invention relates to drag scrapers such as are used for the grading of ground or similar excavating purposes, and has for its object to provide a device simple in both operation and construction, which will be readily freed from the load upon dumping at the end of a scraping or excavating movement in a positive manner without regard to any special effort on the part of the operator to insure such freeing.

A further object of the said invention is to provide load-freeing means in such a drag scraper which will be automatically operable upon the operation of the cables effecting the movement of the scraper to release the said scraper from the load prior to its being dragged back from the position which it occupies at the end of its scraping movement, whereby the necessity for additional cables or releasing means for effecting the operation of the load-freeing means is obviated.

The invention further contemplates the provision of a drag scraper body in the form of an inverted channel structure open at both ends and having a scraper hingedly attached to the rear portion thereof so that it may be lifted and lowered from and into contact with the work, said scraper being provided with means at its lower end for the attachment of cables thereto extending forwardly and rearwardly thereof for the movement of the device forwardly or rearwardly, the rearwardly extending cable being intended to pass through a suitably disposed tail block and the upper end of the scraper being provided with a sheave through which said cable is adapted to be returned and which is adapted to raise or assist in the raising of said scraper when the return cable is tensioned for the return movement of the device after a scraping operation, whereby, prior to such return movement, the load is freed from the scraper by such raising and by the opening of the rear end of the device, due to the raising of the scraper, so that obstruction to the rearward or return movement of the said device, is minimized.

Still further objects subsidiary to or resulting from the aforesaid objects, or from the construction or operation of the invention as it may be carried into effect, will become apparent as the said invention is hereinafter further disclosed.

In carrying the said invention into effect, I may provide a drag scraper having a body portion of inverted channel formation, the lower edges of the depending sides of which act as runners, with a scraper proper in the form of a gate hingedly mounted over the rear end of the said body portion, and in operative position closing the same, said scraper having lateral arms extending over the sides of the body and pivoted thereon; a cable extending forwardly from the lower part of the scraper through suitable guides at the forward end of the body, and a further cable extending in the opposite direction from the lower part of the scraper, a sheave being provided at the upper end of the scraper whereby said last mentioned cable may be extended rearwardly to and over a suitably mounted tail block and thence through said sheave, the two cables being connected to a double drum hoist so that either of them may be operated to effect the movement of the drag scraper upwardly or rearwardly.

All of which is more particularly described and ascertained hereinafter, by way of example, having reference to the accompanying drawing, wherein—

Similar characters of reference indicate similar parts in the several figures of the drawings.

Figure 3:
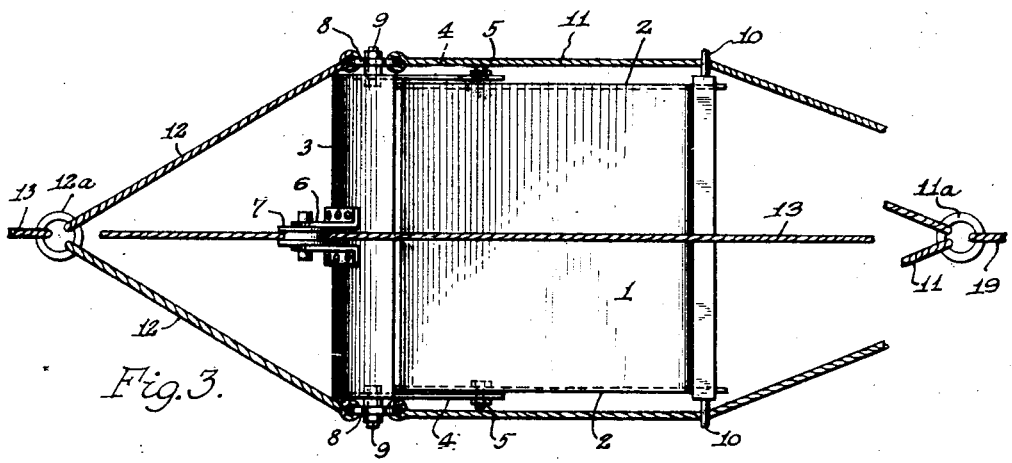
Figure 3 is a plan of the closed drag scraper.
Figure 1:
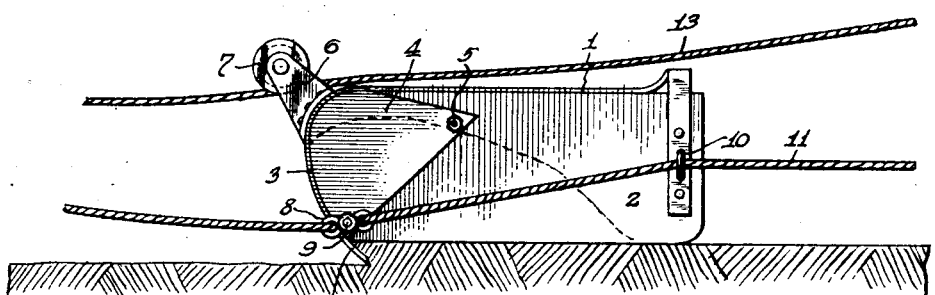
Figure 1 is a side elevation of a drag scraper embodying the said invention, in a closed position.

1 indicates a drag scraper body of inverted channel formation having side members 2, the lower edges of which act as runners over the material being excavated, the said body being open at the front and rear ends, but the rear end being provided with a closure in the form of a gate 3, the lower edge of which is in the form of a scraper proper 3ª, provided with side members 4 overlapping the sides 2 of the body and pivoted thereon at 5 to provide for an upward swinging movement of the said gate 3.

The upper part of the said gate 3 is provided with a sheave 6 including a pulley 7 and the lower part of the gate with shackles 8 which may be pivotally mounted as at 9. Mounted at the forward end of the body are eyes in the form of U-bolts 10 through which cables 11 extend forwardly from the shackles 8 to a ring 11ª, and 12 are further cables extending rearwardly from the said shackles to a ring 12ª.

In use, a cable 13 is passed from the ring 12ª through a tail block 14 suitably secured to a support 15 to the rear of the work and thence the cable 13 extends forwardly through the sheave 6 to the upper drum 16 of a two-drum hoist 17, the lower drum 18 of which receives a cable 19 extending from the ring 11ª. Thus the drag scraper may be moved forwardly or rearwardly over the work according to the direction of operation of the said drums.

The height of the tail block 14 is substantially above the shackles 8 and preferably above the pivots 5, and the relation of the said tail block and the drum 16 of the hoist is such that normally the sheave 6 is substantially below a plane extending between the said sheave block and the point of contact of the cable 13 with the said drum, so that upon the tensioning of the said cable 13 the gate 3 will be raised both by the upward pull of the cable on the shackles and the upward lifting of the pulley 7 by the straightening of the said cable between the drum 16 and the tail block.

Figure 2:
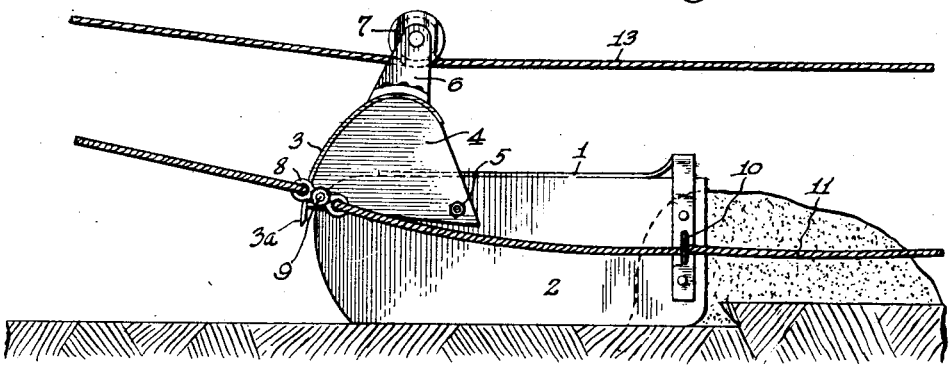
Figure 2 is a similar view illustrating the drag scraper in an open position.

This upward lifting of the gate 3 results in the unclosing of the open rear end of the body of the device as is clearly illustrated in Figure 2 of the drawing. This condition exists when the cable 13 is operated for the dragging of the device rearwardly over the work after a scraping operation has been completed, and as soon as the cable is slackened to permit the forward movement of the device, the support of the gate is relieved so that it again falls into operative position relative to the ground or work, and the tension on the cable 19, results from the operation of the drum 18 to effect the forward scraping movement of the device, retains the gate and its scraper 3ª in such operative position.

Upon the completion of a scraping operation and the subsequent operation of the cable 13 for the return of the scraper to its original position, the lifting of the gate 3 in the manner described relieves it from the material which has been dragged in front of it and prevents the said gate from dragging such material back with it as it moves rearwardly, and where the material is ordinarily inclined to clog the device, such as in the case of clay, this is of decided benefit and greatly increases the efficiency of the drag scraper.

It will be readily apparent that no attention on the part of the operator is required to insure this freeing action after each operation of the scraper, and that such freeing action is entirely automatic without introducing any further cables or complicated mechanism beyond that required for the actual movement of the drag scraper itself.

Figure 4:
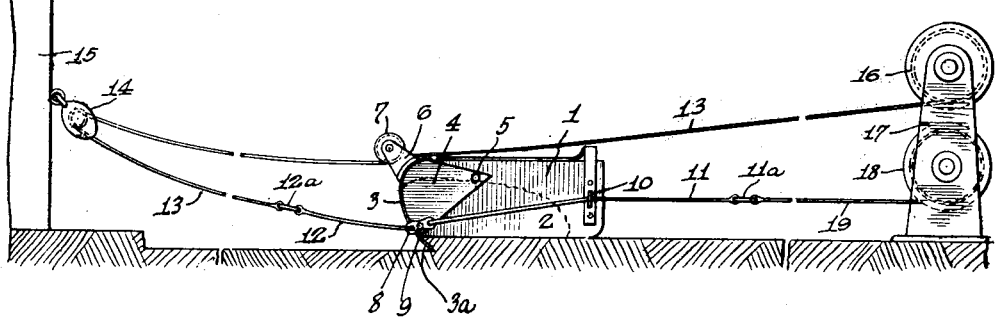
Figure 4 illustrates in elevation, my improved drag scraper in use, performing a scraping operation.
Figure 5:
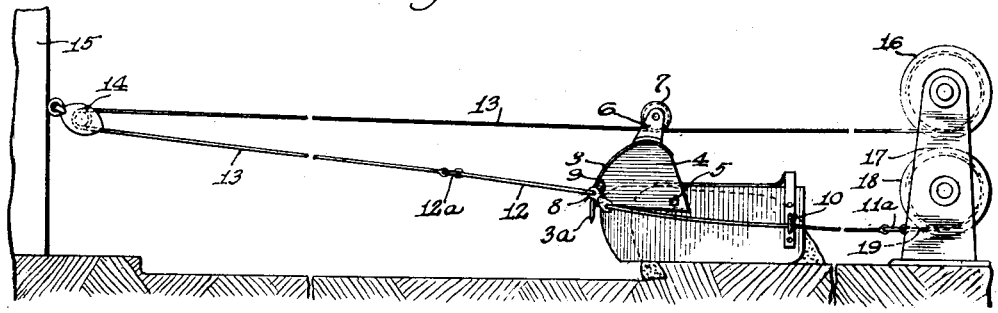
Figure 5 is a similar view to Figure 4, illustrating the parts in a different position.
Figure 7:
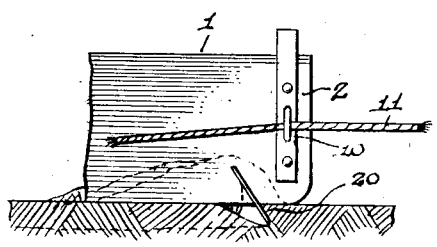
Figure 7 is a fragmentary side elevation of a modified form of the same.
Figure 6:
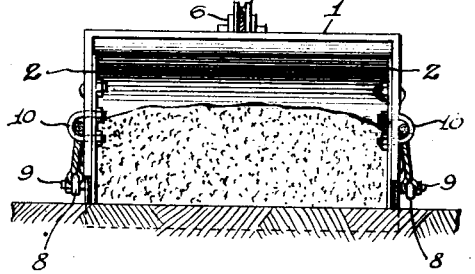
Figure 6 is a front elevation of the scraper in operative position.
Figure 8:
Figure 8 is a fragmentary plan of underside of said modified form.

In Figures 4 and 5 the said walls 2 of the body of the scraper are indicated as having a blade 20 transversely mounted therein which may effect the actual excavating, in which case the scraper 3ª may perform an auxiliary scraping function thereto, or the gate may simply act as a means of confining the material within the body during the forward movement of the device.

This invention may be developed within the scope of the following claim without departing from the essential features of the said invention, and it is desired that the specification and drawing be read as merely illustrative and not in a limiting sense, except as necessitated by the prior art.

What I claim is:—

A drag scraper comprising a hollow body open at the front and rear ends, a closure gate for the rear end of said body hingedly connected thereto and upwardly swingable, cables attached to the lower part of said gate and extending in opposite directions therefrom, a pulley carried by the upper part of said gate, one of said cables being also passed beneath said pulley.

In testimony whereof I affix my signature.

WILLIAM J. SLAVIN.